United States Patent
Debbage

(10) Patent No.: US 12,438,821 B2
(45) Date of Patent: Oct. 7, 2025

(54) SYSTEM FOR STORAGE OF RECEIVED MESSAGES

(71) Applicant: Intel Corporation, Santa Clara, CA (US)

(72) Inventor: Mark Debbage, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 17/561,840

(22) Filed: Dec. 24, 2021

(65) Prior Publication Data

US 2022/0124046 A1    Apr. 21, 2022

Related U.S. Application Data

(60) Provisional application No. 63/237,428, filed on Aug. 26, 2021.

(51) Int. Cl.
    *H04L 47/31*     (2022.01)
    *H04L 67/1097*     (2022.01)
    *H04L 69/00*     (2022.01)

(52) U.S. Cl.
    CPC .......... *H04L 47/31* (2013.01); *H04L 67/1097* (2013.01); *H04L 69/02* (2013.01)

(58) Field of Classification Search
    CPC ...... H04L 47/31; H04L 67/1097; H04L 67/02
    See application file for complete search history.

(56) References Cited

U.S. PATENT DOCUMENTS

| | | | |
|---|---|---|---|
| 10,498,672 B2* | 12/2019 | Graham | G06F 9/54 |
| 2015/0067067 A1* | 3/2015 | Archer | G06F 9/546 709/206 |
| 2016/0072906 A1* | 3/2016 | Shuler | H04L 67/55 709/206 |
| 2017/0118107 A1 | 4/2017 | Jung | |
| 2019/0044827 A1* | 2/2019 | Ganapathi | H04L 43/0811 |
| 2020/0218698 A1 | 7/2020 | Lee et al. | |
| 2020/0358721 A1* | 11/2020 | Rimmer | H04L 49/9068 |
| 2021/0073158 A1 | 3/2021 | Badger | |
| 2021/0117249 A1* | 4/2021 | Doshi | H04L 67/1001 |
| 2021/0329061 A1* | 10/2021 | Grant | H04L 67/10 |

(Continued)

FOREIGN PATENT DOCUMENTS

| | | | | |
|---|---|---|---|---|
| WO | WO-2013079130 A1 * | 6/2013 | ............ | G06F 13/28 |
| WO | WO-2020236295 A1 * | 11/2020 | ......... | G06F 12/0862 |

OTHER PUBLICATIONS

International Search Report and Written Opinion for PCT Patent Application No. PCT/US22/38399, Mailed Nov. 2, 2022, 10 pages.

(Continued)

*Primary Examiner* — Shean Tokuta
(74) *Attorney, Agent, or Firm* — Compass IP Law PC

(57) ABSTRACT

Examples described herein relate to a network interface device performing offloaded tag matching operation to support both one or more eager transactions and one or more rendezvous transactions using a tag-matching protocol. In some examples, the tag matching operation is offloaded from a server to the network interface device. In some examples, the network interface device is to receive messages from one or more senders, wherein the messages comprise tags and select one or more of the messages to write into a buffer based on matching on sender and/or tag.

20 Claims, 11 Drawing Sheets

(56) References Cited

U.S. PATENT DOCUMENTS

2022/0124046 A1* 4/2022 Debbage ............. H04L 67/1097
2022/0229800 A1* 7/2022 Kundu ................ H04L 43/0876
2022/0358002 A1* 11/2022 Zhong ..................... H04L 69/22

OTHER PUBLICATIONS

Matthew J. Koop et al., 'Designing high-performance and resilient message passing on InfiniBand', In: 2010 IEEE International Symposium on Parallel & Distributed Processing, Workshops and Phd Forum (IPDPSW), May 24, 2010.

Bayatpour Mohammadreza et al: "Communication-Aware Hardware-Assisted MPI Overlap Engine", Jun. 15, 2020 (Jun. 15, 2020), pp. 517-535, [retrieved on Jun. 15, 2020].

Bayatpour Mohammadreza et al: "Design and Characterization of InfiniBand Hardware Tag Matching in MPI", 2020 20TH IEEE/ACM International Symposium On Cluster, Cloud and Internet Computing (CCGRID), IEEE, May 11, 2020 (May 11, 2020), pp. 101-110, DOI: 10.1109/CCGRID49817.2020.00-83 [retrieved on Jul. 13, 2020].

Extended European Search Report for Patent Application No. 22861875.7, Mailed Jun. 12, 2025, 7 pages.

* cited by examiner

SYSTEM FOR STORAGE OF RECEIVED MESSAGES

RELATED APPLICATION

The present application claims the benefit of priority of U.S. Provisional application Ser. No. 63/237,428, filed Aug. 26, 2021. The contents of that application are incorporated herein in their entirety.

BACKGROUND

Message Passing Interface (MPI) is a communication protocol used for programming computers for parallel computing. Some examples of MPI specifications are available to Message Passing Interface Forum. Tag matching allows an application to specify an association between sent messages and memory to store the sent messages, so that messages can be delivered to the specific desired addresses in application memory rather than arbitrary buffers. The sender sends messages with a tag value and the receiver posts receive buffers with a tag value and a tag mask. Tag-matching defines how the sent messages are matched to receive buffers.

DETAILED DESCRIPTION

A non-matching send/receive model provides that messages are delivered in their arrival order to receive buffers obtained from a receive queue or shared receive queue. With the non-matching model, posted receive buffers to be considered equivalent since message arrival order is generally not known a priori to the receiver. An application can post receive buffers of the same size, leading to inefficiencies when using variable-length messages, particularly when message sizes vary dramatically. Additionally, some application use cases require that messages are delivered to specific application address ranges. This copy or write leads to significant overhead of CPU cycles and memory bandwidth.

Some examples provide a general-purpose tag-matching send/receive model and can be used to implement message-oriented protocols, such as those with direct receive-to-application-memory rather than arbitrary receive buffers. Tag-matching send/receive can be used to implement efficient point-to-point messaging as defined by the Message Passing Interface (MPI) which can be used in High Performance Computing (HPC) and Artificial Intelligence (AI) workloads. Some examples provide an extension to the RDMA Verbs architecture to support a send/receive model with tag matching. For an example description of RDMA Verbs, see Internet Engineering Task Force (IETF) "RDMA Protocol Verbs Specification" (2003) and variations and revisions thereof.

Instead of different protocols for eager and rendezvous, some examples provide a protocol for eager and rendezvous or eager/no rendezvous or eager and rendezvous/no eager communications. Rendezvous communications can have an allocated receiver buffer to receive communications. Eager communications may not have an allocated receiver buffer to receive communications.

Figure 1:
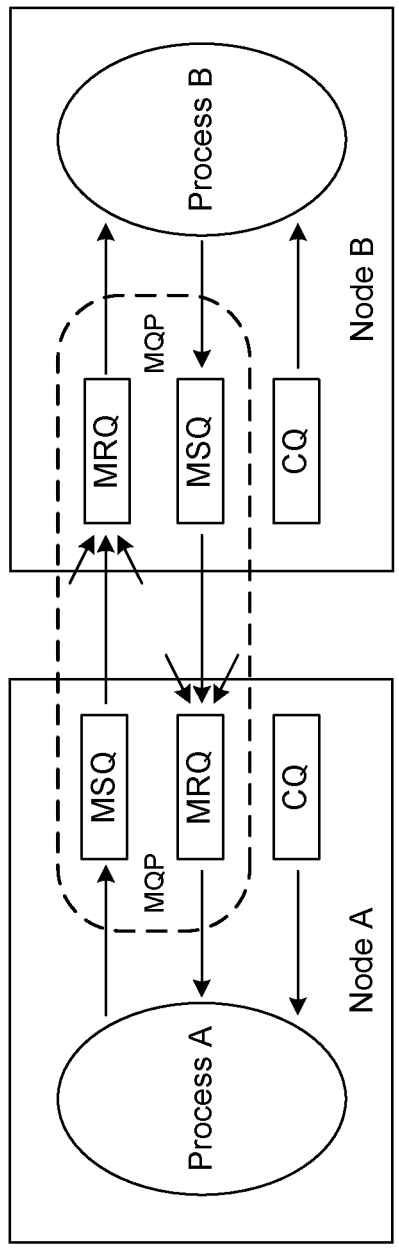
FIG. 1 depicts an example tag matching send receive (TMSR) Architectural Model.

FIG. 1 depicts an example tag matching send receive (TMSR) Architectural Model. Node A can include a network interface device and computing platform. Similarly, Node B can include a network interface device and computing platform. Examples of nodes A and B are described with respect to FIG. 11 and accompanying text. An example of a network interface device is described with respect to FIG. 10 and accompanying text. Node A can execute a process A that communicates with a process B executed by Node B and utilizes MPI for communications. The network interface devices of nodes A and B can perform offloaded operations of TMSR, as described herein.

Queue pairs (QPs) support a send/receive model. A Matched Queue Pair (MQP) can refer to a QP that is enabled for tag matching. For an MQP, tag-matching capability is supported by both ends of the MQP and this is negotiated as a vendor extension at MQP connection time. An MQP can reliably deliver messages from the send-side of the MQP to the receive side of the MQP (in each direction). MQPs can support tag-matched send/receive and do not support standard send/receive nor RDMA.

The MQP can be associated with a completion queue (CQ), which may also be associated with a plurality of QPs and/or plurality of MQPs. An MQP can be associated with a Matched Send Queue (MSQ) and Matched Receive Queue (MRQ). The MSQ can be used to post tag-matching sends (TM_SENDs), and the MRQ can be used to post tag-matched receives (TM_RECVs). A process may use many MQPs allowing it to use tag-matched communication with many other processes. Multiple MQPs may be associated with the same MRQ, comparable to the use of a Shared Receive Queue (SRQ) across multiple QPs. One MRQ per process may be sufficient but a process may also use multiple MRQs. MSQs are specific to an MQP in order to provide send-side queuing and ordering on a per-MQP basis without potential head of line (HoL) blocking across multiple destinations.

MRQ can be shared across many MQPs, CQ can be shared across many sources of completion.

Message order can be preserved from the send-side of an MQP to the receive side of the MQP. Since multiple MQPs may be associated with a single MRQ, messages from different MQPs may be interleaved before reaching the MRQ. The message order arriving at an MRQ can be preserved on a per-MQP basis but arbitrarily interleaved across different MQPs. This ordering semantic may be assumed by applications.

Tag matching can associate an arriving message with a posted receive. This association can be implemented at the receiver using the tag-matching technology, such as a list walk with a matching comparison made on elements in the list to find the first match. The tag matching comparison can be performed under a tag mask to allow specific tag bits to be included in or excluded from the comparison.

TMSR offload can occur whereby a host offloads tag matching technology to network interface device to perform tag matching. A network interface device can be implemented as one or more of: a network interface controller (NIC), SmartNIC, router, switch, forwarding element, infrastructure processing unit (IPU), or data processing unit (DPU).

TMSR may not define the meaning of one or more of the bits in the tags, and tag interpretation is specified by higher-level software. For example, the rank concept in MPI is an integer value used for logical addressing of sources and destinations within a communication context. An MPI implementation can choose how many bits to use for rank, where to place rank into the 128-bit tag and assign rank values to sources and destinations. The MPI implementation needs to create an MQP topology and use the correct MQP to allow a source to send a message to the correct destination. In MPI, the source rank information tag is used on the destination side for selecting or wildcarding the source rank. TMSR is oblivious to these choices and needs no knowledge of rank.

The sender provides a 128-bit tag value (SendTag) per message, and the TMSR protocol sends this value to the receiver to support receive-side tag matching. The receiver provides a 128-bit tag value (RecvTag) and a 128-bit tag mask (MaskTag) with posted receive buffer. Since tag matching is performed on the receive side, RecvTag and MaskTag are not communicated through the network.

The tag-matching technology applied to messages as they arrive at the MRQ can be as follows. The MRQ is associated with two lists, and both are initially empty. A list of unexpected messages can be messages that have been received but have not yet been matched to a receive buffer. An entry on the list contains the SendTag and the information to initiate a message transfer once the match is made.

A list of posted receives can include received messages that have been posted but have not yet been matched. List entries can include the receive buffer, RecvTag and MaskTag.

For a receive buffer that is posted to the MRQ: (1) a list of unexpected messages (in their arrival order) can be traversed to find a first match (if any) between the posted receive and an unexpected message and (2) if a match is found, the unexpected message is removed from the list and the message transfer is initiated and once the message transfer has completed, a completion is delivered to the associated CQ. However, if a match is not found, the posted receive is appended to the posted receive list.

For a message arriving at the MRQ: (1) a list of posted receives (in their posted order) can be traversed to find a first match (if any) between the arriving message and a posted receive and (2) if a match is found, the posted receive is removed from the list and the message transfer is initiated. Once the message transfer has completed, a completion is delivered to the associated CQ. However, if a match is not found, the message is appended to the unexpected message list.

In some examples, a sent message and a posted receive can match if SendTag & MaskTag is equal to RecvTag & MaskTag, where "&" represents the bitwise-AND operation. SendTag is provided by the message, and RecvTag/MaskTag by the posted receive. The application can use MaskTag to specify which bits are to be included or excluded in the match comparison to give a powerful and general-purpose selective wildcarding capability.

Message metadata can be stored in an unexpected message list. The actual message payload can be discarded and recovered, if necessary, from the sender using the message protocol.

In addition to send and receive operations, cancel operations are supported. The motivation for cancel is to reclaim posted operation state for clean-up purposes. For example, the receive side may post many posted received without knowing whether they will be consumed by matching sends at program end. The receiver can cancel these unmatched, posted receives to allow resources to be cleaned up.

In some examples, datagrams can be sent using RDMA Verbs as a reliable transport protocol that provides end-to-end reliable delivery of datagrams. Connection establishment and prioritization using RDMA Verbs can be based on Queue Pair numbers or connection identifiers.

Example RTS/CTS Protocol

Send and receive operations can be posted and matched before the sent data is delivered to application memory. When a sent data arrives before the posting of the matching receive, the data is identified as unexpected. Unexpected data can be stored temporarily in an unexpected buffer at the receiver or discarded if space is not available. Once or after the matching receive is posted, unexpected data is copied to application memory. When a send arrives after the posting of the matching receive, the data is expected and can be delivered directly to application memory.

If a sender sends the data before the sender determines that the matching receive has been posted, the data can be sent eagerly. Rendezvous can occur where the sender can be informed that a matching receive has been posted. In rendezvous, the sent data is expected and delivered directly to application memory. Eager send can achieve lower latency by avoiding the rendezvous but may result in unexpected data and potentially discarded data. Rendezvous send can achieve greater efficiency by avoiding unexpected data, avoiding potential exhaustion of the unexpected buffer and avoiding the memory copy from unexpected buffer to application memory. However, rendezvous setup can incur network round-trip time which uses either larger message sizes or pipelined/streaming messages to hide overhead.

A receiver can support both eager and rendezvous modes using a protocol that handles unexpected buffer usage and exhaustion. End-to-end packet reliability can be provided by lower level mechanisms and may not be provided by the tag-matching protocol. The tag-matching protocol can treat sent packets as delivered reliably or results in an error indication where delivery is not possible (e.g., the network has failed such that there is no path from the packet sender to the packet receiver). Tag-matching protocol can propagate error indications as a Verbs error code and not implement its own retry.

In an eager mode, a sender sends a packet without indication of whether receiver can receive packet. The protocol from the requester's perspective can be as follows. TM_SEND represents the posting of a tag-matched send on a particular MQP with a SendTag. The requester can fragment the sent message into packets according to maximum transmit unit (MTU) size. The application memory for the sent message can be described by a scatter-gather list (SGL). A first sent packet can include a tag-matching request to send (TM_RTS) opcode. TM_RTS provides send information to the receiver to allow the tag-matching scheme to be run. TM_RTS can be sent eagerly and may optionally contain eager payload. Packets with tag matching data (TM_DATA)

opcode may be pipelined after the TM_RTS to send additional eager payload from the requester to the responder.

At the requester, the arrival of a tag-matched clear to send (TM_CTS) opcode from the responder indicates that a tag match has been made, and the requester may now send the non-eager portion of the message payload. The rendezvous has been made, and subsequent packets of this message are to result in expected data and direct delivery to application memory. The requester can pipeline the remaining payload in a series of TM_DATA packets. The TM_DATA may not be distinguished between eager and rendezvous sends.

At the requester, the arrival of the TM_END packet indicates that the message has been delivered to the receiver and is also remotely complete. Completion to the application is denoted CPL and can be triggered on local completion or remote completion depending on application specifications.

Figure 2:
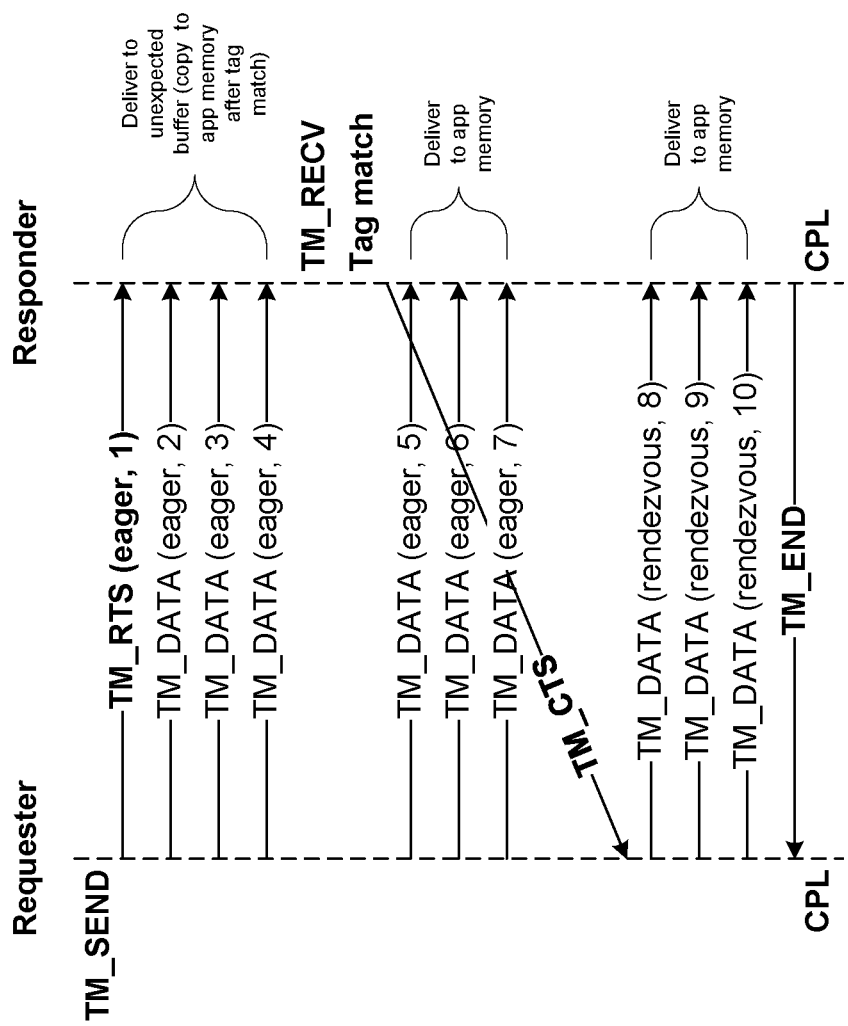
FIG. 2 depict an example tag-matching protocol.
Figure 3:
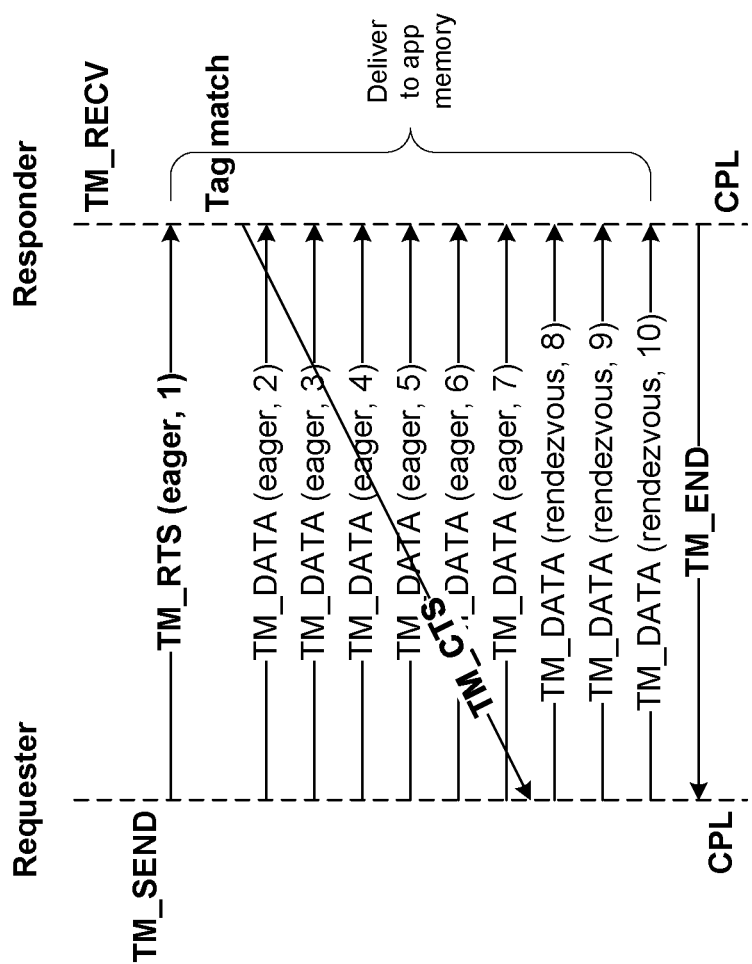
FIG. 3 depicts an example tag-matching protocol.

In FIGS. 2 and 3, the numbers 1-10 identify the message fragment order for illustration purposes. In some examples, the arrival of TM_CTS can delineate between earlier eager packets and subsequent rendezvous packets. A successful tag matching delineates between earlier unexpected packets (eager) and subsequent expected packets (either eager or rendezvous). Depending on the message size and the threshold between the eager and rendezvous transfers, a particular message may transfer message data in eager packets, message data in rendezvous packets or some in eager packets followed by some message data in rendezvous packets.

The following provides an example operation of a responder. TM_RECV can represent the posting of a tag-matched receive on a particular MQP with a RecvTag and MaskTag. The application memory for the received message can be described by a scatter-gather list (SGL), and received packets can be reassembled and delivered into the receive SGL. TM_RECV may be posted either before or after the arrival of TM_RTS.

FIG. 2 depicts an example tag-matching protocol with TM_RTS arrival before TM_RECV posting. In this example, the TM_RTS arrival triggers the tag-matching technology and can be appended to the unexpected list to wait for matching to the TM_RECV. One or more eager data is unexpected and can be held in unexpected buffering. The case where the available unexpected buffer is exhausted is described subsequently. When the TM_RECV is subsequently posted, the match is made, and message payload held in the unexpected buffer may be copied to application memory.

FIG. 3 depicts a tag-matching protocol with TM_RECV posting before TM_RTS arrival. TM_RECV can be appended to the pending receives list. Once TM_RTS arrives, the tag matching technology results in a match. Unexpected buffering is not used in this scenario, and better performance can be achieved when applications are to post TM_RECV operations early relative to sends. Eager data in the TM_RTS and subsequent eager TM_DATA can be delivered directly to application memory. The match results in a tag-matching clear to send (TM_CTS) being sent from the responder to the requester.

Arriving rendezvous TM_DATA after the match can be delivered directly to application memory. The responder detects the completion of the message when sent bytes are received. The responder sends a TM_END packet to the requester to inform the requester of remote completion. The responder delivers a completion (CPL) to the application.

Depending on the message size, the threshold between the eager and rendezvous transfers, and the timing of TM_RTS versus the matching TM_RECV, a particular message may transfer message data via the unexpected buffer, message data directly to application memory, or some via the unexpected buffer interleaved with some directly to application memory.

If the entirety of the send message can be delivered to the application at the point of matching (e.g., the eager data is available through the current packet or via the unexpected buffer), the responder can coalesce the TM_CTS and TM_END into one or more TM_END packets to reduce overhead.

Figure 4:
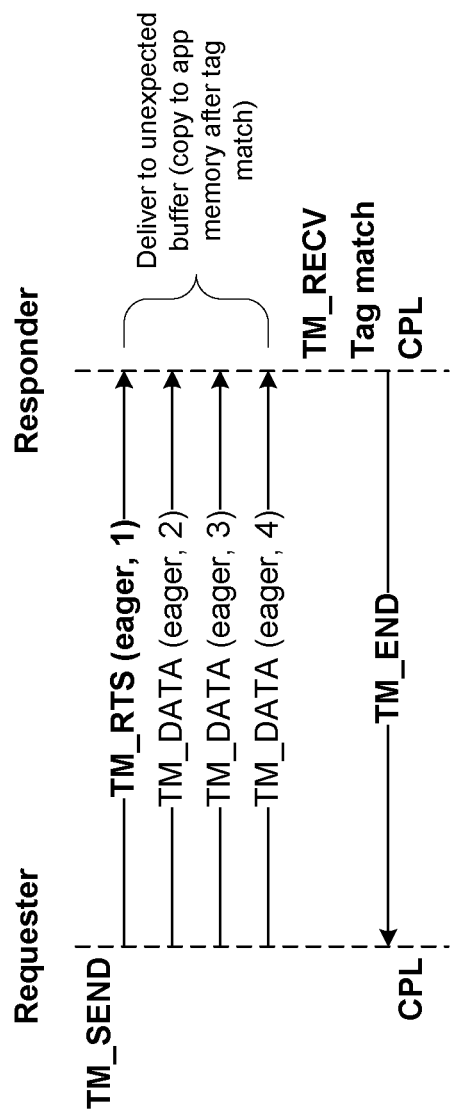
FIG. 4 depicts an example operation of a tag-matching protocol.

FIG. 4 depicts an example operation of a tag-matching protocol with late TM_RECV and TM_CTS coalesced into TM_END. A buffer allocated for unexpected fragments can store unmatched receive fragments. A receiver can send discarded packets and sender can resend discarded packets to receiver. Discarded data can be indicated to sender as part of a CTS. In some cases, discarded data can be identified using NACK or time out because ACK not received promptly.

Figure 5:
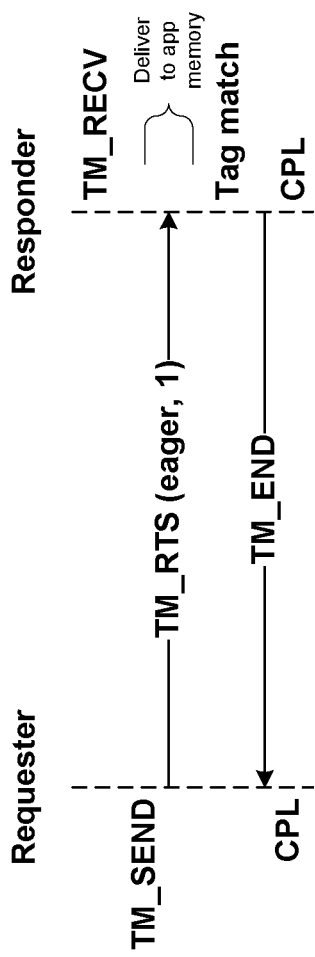
FIG. 5 depicts an example tag-matching protocol

FIG. 5 depicts tag-matching protocol with early TM_RECV and TM_CTS coalesced into TM_END. A CTS can be sent after a tag match. Rendezvous packets can be sent after CTS. A buffer can be allocated for rendezvous packets.

RTS/CTS Protocol with Unexpected Buffer Exhaustion

Figure 6:
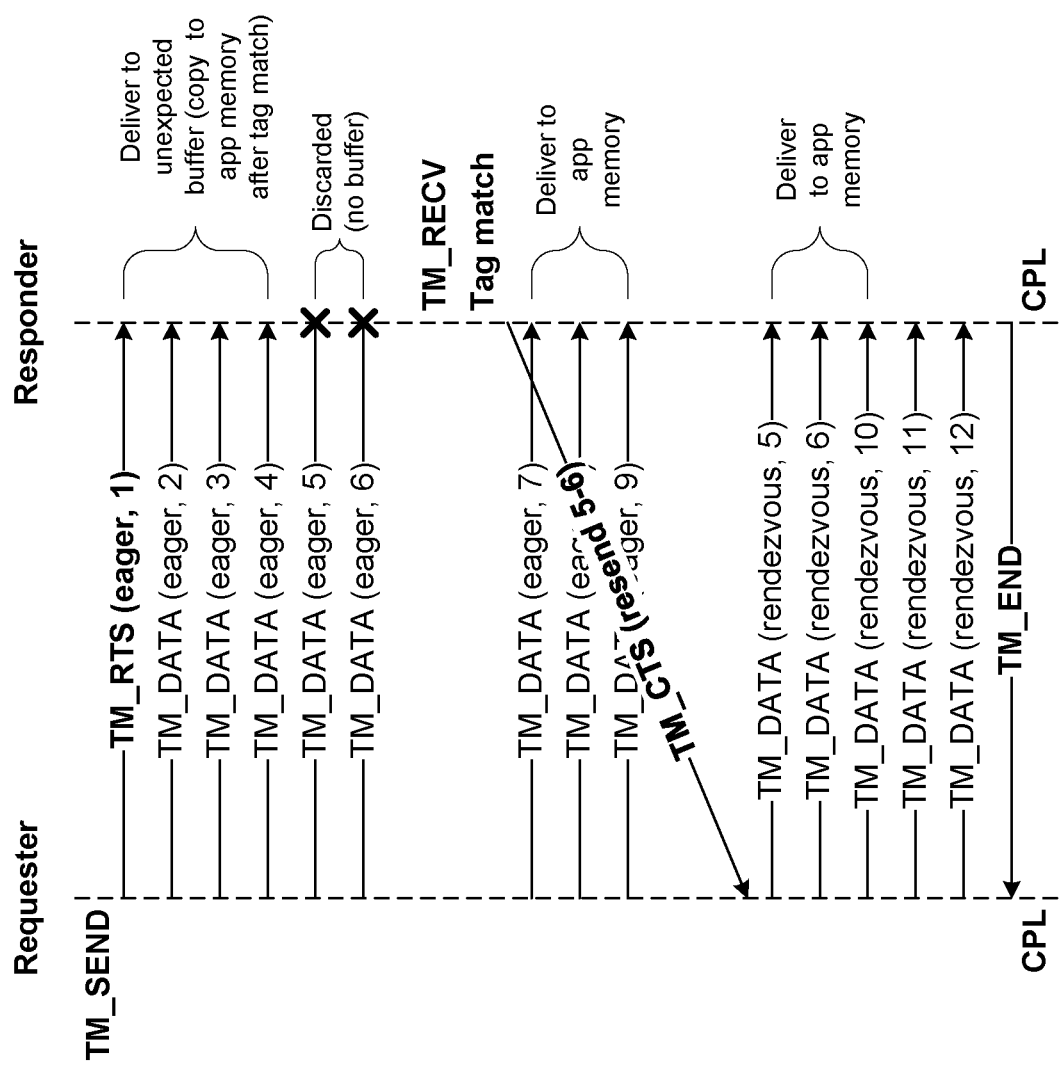
FIG. 6 depicts tag-matching protocol.

FIG. 6 depicts tag-matching protocol, TM_RTS arrival before TM_RECV posting, with exhaustion or filling of one or more buffers that are to receive unmatched data, e.g., one or more unexpected buffers. RTS/CTS Protocol with Unexpected Buffer Exhaustion can be used when the unexpected buffer is exhausted. Some of the unexpected payload may be discarded due to lack of unexpected buffer capacity. An unexpected or unmatched payload in TM_RTS packets may be discarded, but the other information in TM_RTS packets can be delivered to the tag-matching technology. When a posted TM_RECV matches the message, the set of discarded payload is identified to the responder and sent to the requester in the TM_CTS packet. Since arriving TM_DATA after the match can be expected data, no more payload can be discarded for this message. The requester uses the information in the TM_CTS packet to resend the discarded packets as rendezvous packets before sending remaining payload for this message.

RTC/CTC Cancellation Protocol

In some scenarios, there can be a race between cancellation and tag matching. If cancellation happens before tag matching, the operation is cancelled. If tag matching happens before cancellation, the operation can complete as usual and the cancel can be ignored. A send/receive that has already been matched may not be cancelled as a matched operation will complete in bounded time.

If the TM_RTS packet has been sent, the cancellation can be resolved using the TM request to cancel (TM_RTC) and TM clear to cancel (TM_CTC) protocol. The sender can send a TM_RTC packet to the responder. The sender may not send another TM_DATA packets after the TM_RTC packet and waits for the cancel to be resolved with a TM_CTC packet (successful cancel) or a TM_CTS packet (not cancelled).

Figure 7:
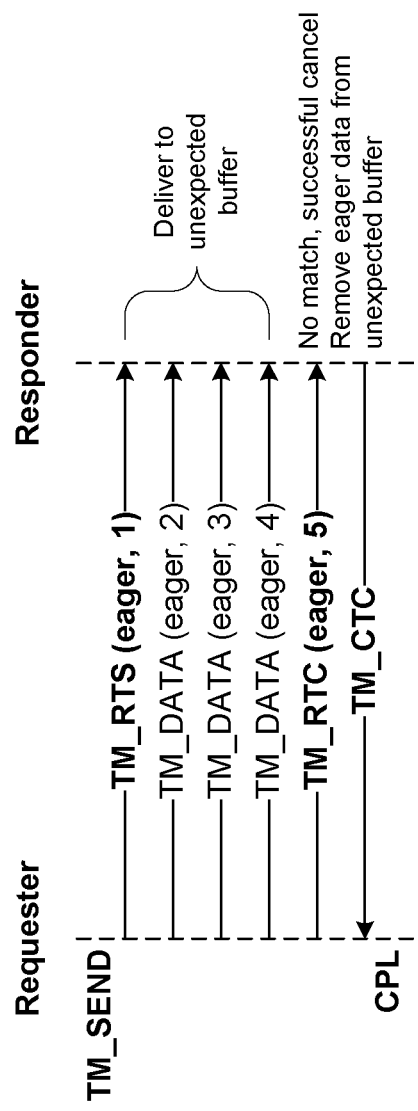
FIG. 7 depicts an example of successful cancellation of a sent message.

FIG. 7 depicts an example of successful cancellation of a sent message. If the send has been queued but the TM_RTS packet has not been sent, the send can be cancelled locally on the sender by removing it from the queue and completing the send with a cancelled status code.

The following describes example activity when the TM_RTC packet arrives on the responder side. If the TM_RTS packet has not been matched, the send is cancelled on the responder side. Eager data from this send that is in the unexpected buffer can be discarded. A TM_CTC packet can be returned from the responder to the requester. The responder can remove the corresponding entry from its unexpected messages list. The requester can complete the send with a cancelled status code. No TM_END packet is used in this scenario, but can be used. If the TM_RTS packet has been matched, the send is allowed to complete, and the cancel has no effect. The responder sends the TM_CTS packet to indicate clear to send, and the sender resumes sending the message using the normal protocol.

Figure 8:
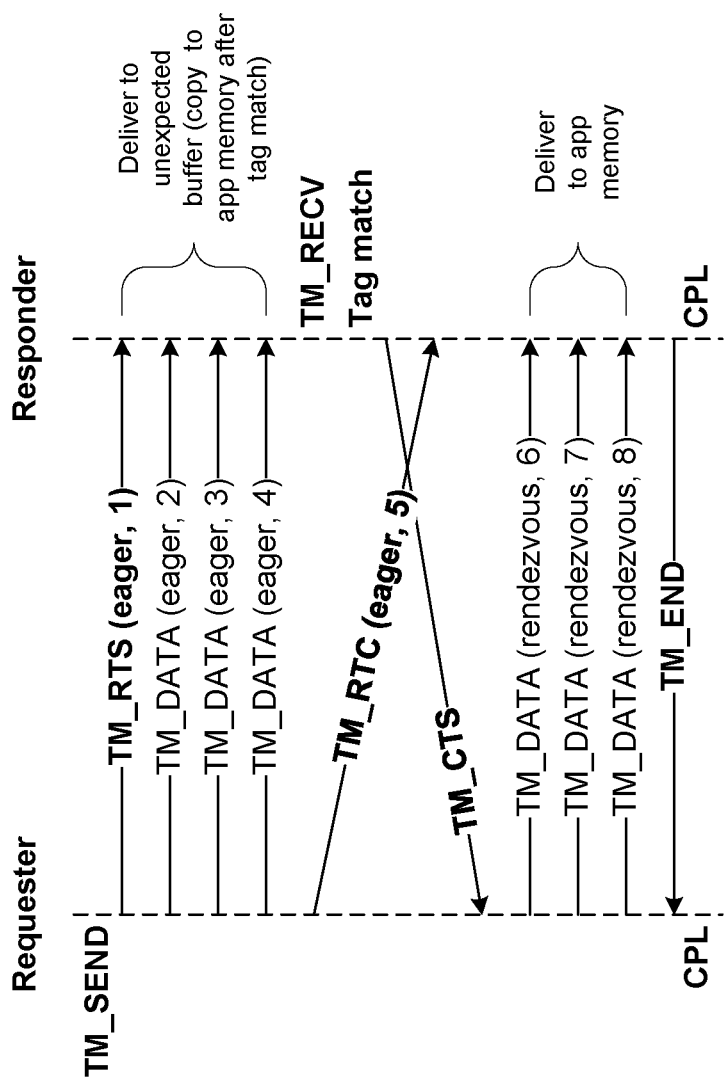
FIG. 8 depicts an example of unsuccessful cancellation of a sent message.

FIG. 8 depicts an example of unsuccessful cancellation of a sent message. A cancelled receive is similar but the race between the message and the cancel operation is resolved locally at the receiver. If the receive has not been matched the posted receive can simply be removed from the expected receives list, otherwise the receive should be allowed to complete and the cancel is ignored.

Example Code Formats

The following are examples of codes that can be used for TMSR. However, different code sizes and different code values can be used and not all codes need to be used.

TMSR can use an OpCode value for Reliable Connection (RC) and Extended Reliable Connection (XRC). Various kinds of TMSR packets can be differentiated using a Sub-OpCode field. This approach uses a common header format for TMSR packets, e.g., Tag-matching Extended Transport Header (TMETH). TMETH can be arranged to reduce header overhead of TMSR packets by placing some variant fields into payload rather than header.

TABLE

| | | OpCode Changes | |
|---|---|---|---|
| Code[7-5] | Code[4-0] | Description | Packet Contents following the Base Transport header |
| 000 Reliable Connection (RC) | 11111 | Tag Matching (TM) Opcode | TMETH, PayLd (when payload length >0) |
| 101 Extended Reliable Connection (XRC) | 11111 | Tag Matching (TM) Opcode | TMETH, PayLd (when payload length >0) |

TABLE

| | TMETH (Tag-matching Extended Transport Header) | | | |
|---|---|---|---|---|
| | bits | | | |
| bytes | 31-28 | 27-24 | 23-16 | 15-8 | 7-0 |
| 0-3 | SubOpCode | | Rsvd | MessageID |
| 4-7 | VariantField - usage of this 32-bit field varies by SubOpCode: TM_RTS: MessageLen TM_RTC: BufferRequestHint TM_DATA: Offset TM_CTS: BufferAvailableHint TM_CTC: BufferAvailableHint TM_END: BufferAvailableHint | | | |

SubOpCode—4 Bits

Example supported sub-opcodes are defined in the following table:

TABLE

| | SubOpCode encoding | | |
|---|---|---|---|
| SubOpCode | Usage | Direction | TMETH Field and Payload Usage |
| 0 | TM_RTS - request to send | Requester to responder | MessageID (32 b) - ID for this message MessageLen (32 b) - send message length in bytes Payload: SendTag (128 b) - sender tag information |

TABLE-continued

SubOpCode encoding

| SubOpCode | Usage | Direction | TMETH Field and Payload Usage |
|---|---|---|---|
| | | | BufferRequestHint (32 b) - hint that the sender would like this amount of unexpected data buffering (in bytes) for future send data<br>Data - eager data (optional) The offset of the eager data is 0 and not encoded in the packet. |
| 1 | TM_RTC - request to cancel | Requester to responder | MessageID (32 b) - ID for this message<br>BufferRequestHint (32 b) - hint that the sender would like this amount of unexpected data buffering (in bytes) for future send data<br>Payload - none |
| 2 | TM_DATA - data | Requester to responder | MessageID (32 b) - ID for this message<br>Offset (32 b) - byte offset of data relative to start of a sent message<br>Payload - eager/rendezvous data |
| 3 | | | Reserved |
| 4 | TM_CTS - clear to send | Responder to requester | MessageID (32 b) - ID for this message<br>BufferResponseHint (32 b) - hint that the receiver may have this amount of unexpected data buffering (in bytes) for future send data<br>Payload - 8 bytes and is interpreted as follows:<br>StartOfDiscardedData (32 b) - start of discarded data (offset in bytes relative to beginning of message)<br>EndOfDiscardedData (32 b) - end of discarded data (offset in bytes relative to beginning of message) |
| 5 | TM_CTC - clear to cancel | Responder to requester | MessageID (32 b) - ID for this message<br>BufferResponseHint (32 b) - hint that the receiver may have this amount of unexpected data buffering (in bytes) for future send data<br>Payload - none |
| 6 | TM_END - message end | Responder to requester | MessageID (32 b) - ID for this message<br>BufferResponseHint (32 b) - hint that the receiver may have this amount of unexpected data buffering (in bytes) for future send data<br>Payload - none |
| 7-15 | | | Reserved |

MessageID can be used to differentiate messages. The requester can allocate a MessageID for a new message that is sent on an MQP, starting with a MessageID of 0 and incrementing thereafter. A requester may choose to support a lower number of concurrent messages. For a particular message, the assigned MessageID can be inserted into the TM_RTS packet by the requester, and the responder may use that value in corresponding TM_CTS, TM_CTC and/or TM_END packets. The requester can use that same value for TM_DATA packets associated with that message. This field can be used by the requester and the responder to map incoming packets on an MQP to the appropriate message and to locate tracking state for that message. A MessageID on an MQP may be reused after the previous use of that MessageID has completed, as indicated by the requester receiving a TM_END or TM_CTC packet using that MessageID.

MessageLen can indicate a length of the message in bytes. The TM_RTS packet can include the message length that the sender is requesting to send, so that the receiver can detect when sent data has been received. For example, the receiver can count the aggregate number of received bytes in TM_DATA packets and detect when this becomes equal to MessageLen to indicate the end of the message and then trigger the TM_END packet and receive-side completion.

A sent message can be smaller, equal or larger than the posted receive to which it is matched. In the smaller scenario, the receive application memory is partially filled (in a contiguous manner from the starting address). In the equal scenario, the receive application memory can be filled. In the larger scenario, data can be sent and the sent data is truncated on the receive side to fit into the receive application memory. The actual length of the data that was delivered into the receive application memory can provided in the completion for the posted receive and can be equal to the lesser of the send message size and receive application memory size.

Offset field can be used by the requester to specify the offset of the data that is being delivered to the responder. TM_RTS can be a first packet in a message so TM_RTS does not have an Offset field and the offset can be implied to be 0. TM_DATA packets can use offset to specify the offset for their payload. After sending a packet, the requester can add the current offset to the amount of payload that was placed in the payload of that packet to give the value of Offset for the next packet of that message.

The responder can match the message to a posted receive to give the SGL for the receive memory. For an arriving packet with data, the responder uses the offset to determine the portion of the SGL that the data should be delivered to. The offset can be explicitly encoded in TM_DATA packet to allow for out-of-order delivery of message data. The offset can be used for resending discarded data and can also be used in combination with an unordered transport as a performance optimization.

For unexpected data, the receiver manages the allocation of the unexpected buffer according to implementation-specific technologies. Packets that are placed in the unexpected buffer may retain their offset value to allow the data to copied to the appropriate offset in the receive SGL after the match is made.

BufferRequestHint and BufferResponseHint can define a size of the unexpected buffer. An implementation may even provide no unexpected buffer and use rendezvous exclusively and accept the performance loss of not supporting eager send. There are many implementation options ranging from dedicated buffering per MRQ to shared buffering across some or MRQs, and hybrid approaches that use a combination of dedicated and shared buffering. For example, the unexpected buffer may be limited to the amount of memory buffer than can be provided in SRAM or other on-chip memory.

In TM_RTS packets, a portion of the payload can be used for SendTag and a second portion of the payload can be used for BufferRequestHint. Other SubOpCodes (notably TM_DATA packets) may not incur the overhead of these fields. The remaining payload of TM_RTS packets may optionally be used for eager payload that is sent with the TM_RTS.

The payload in TM_CTS packets can be used to communicate StartOfDiscardedData and EndOfDiscardedData values from responder to requester.

For TM_CTS packets, the StartOfDiscardedData and EndOfDiscardedData values can be used to specify the range of offsets that may be resent by the requester due to discarded unexpected data at the responder. A single range can be specified where StartOfDiscardedData indicates one or more bytes that were discarded and EndOfDiscardedData can indicate the next byte after the last byte that was discarded. A range [StartOfDiscardedData, EndOfDiscardedData) can indicate that bytes from StartOfDiscardedData (inclusive) to EndOfDiscardedData (exclusive) may be resent. If no bytes may be resent, then both fields can be set to 0. StartOfDiscardedData can be greater or equal to EndOfDiscardedData, or for either value to exceed the amount of eager message data that was sent by the requester for this message.

The following changes to RDMA Verbs could include one or more of the following.

Create, configure, manage and connect MQP, MSQ and MRQ, with modes of existing QP, SQ and RQ Verbs.

Post MQ_SEND work requests to an MSQ including SendTag parameter, including adding MQ_SEND as a new kind of work request.

Post MQ_RECV receive buffers to an MRQ including RecvTag and MaskTag parameters and adding MQ_RECV as a new kind of work request.

Add new completion types for MQ_SEND and MQ_RECV.

Figure 9:
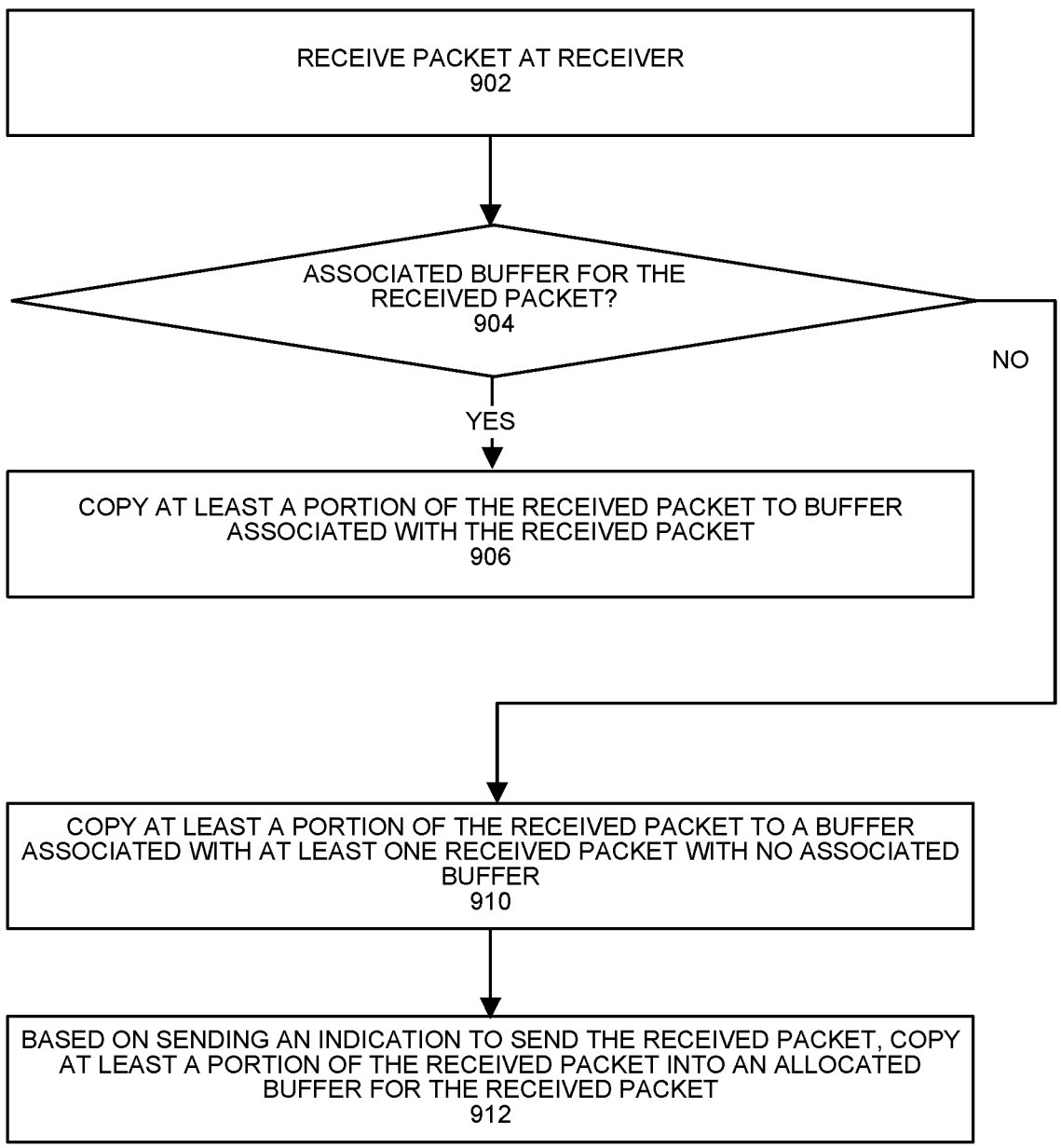
FIG. 9 depicts an example process.

FIG. 9 depicts an example process. The process can be performed by a receiver network interface device in some examples. At 902, a receiver can receive a packet from a sender. At 904, the receiver can determine whether the packet is associated with a receive buffer. For example, the received packet can be associated with a receive buffer based on a tag and/or sender of the packet. For example, the received packet not associated with a receive buffer can be associated with a message sent without prior acknowledgement that the message can be received by the receiver with a clear to send. For example, the received packet associated with a receive buffer can be associated with a message sent with prior acknowledgement that the message can be received by the receiver with a clear to send. Based on the received packet being associated with a receive buffer, the process can continue to 906. Based on the received packet not being associated with a receive buffer, the process can continue to 910.

At 906, the receiver can store the packet in a buffer accessible to an application.

At 910, the receiver can store the packet into an unexpected buffer. At 912, the receiver can copy the stored packet to the receiver buffer after a clear to send for the stored packet after matching a tag for the clear to send with the at least one received eager message. Thereafter, content of the packet can be available for processing by a receiver process. Example can be used with artificial intelligence training or inference, AllReduce, Allgather, and other uses.

Figure 10:
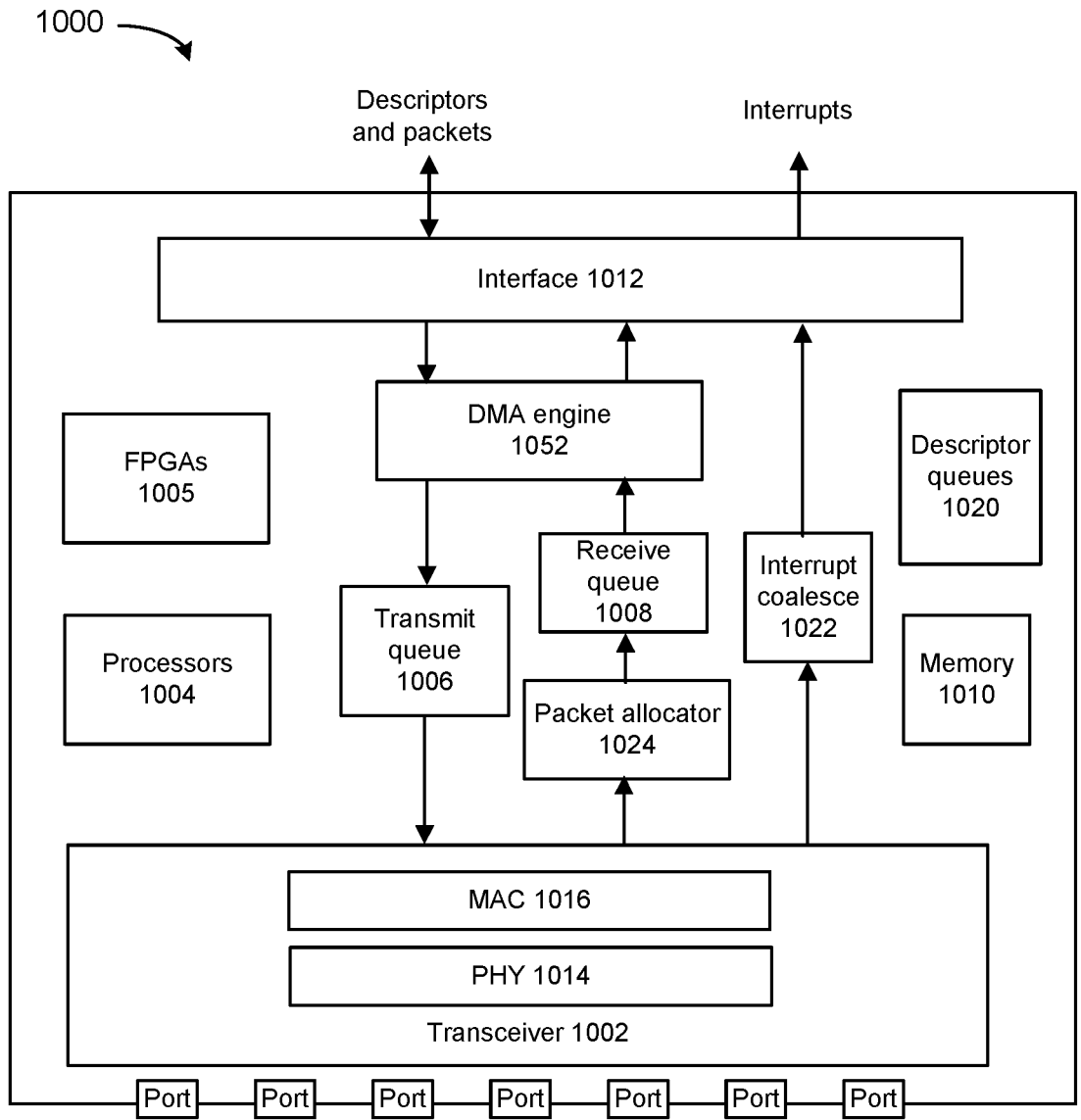
FIG. 10 depicts an example network interface.

FIG. 10 depicts an example network interface. Various processor resources in the network interface can perform tag matching operation to support both one or more eager transactions and one or more rendezvous transactions using a tag-matching protocol, as described herein. In some examples, network interface 1000 can be implemented as a network interface controller, network interface card, a host fabric interface (HFI), or host bus adapter (HBA), and such examples can be interchangeable. Network interface 1000 can be coupled to one or more servers using a bus, PCIe, CXL, or DDR. Network interface 1000 may be embodied as part of a system-on-a-chip (SoC) that includes one or more processors, or included on a multichip package that also contains one or more processors.

Some examples of network device 1000 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1000 can include transceiver 1002, processors 1004, FPGAs 1005, transmit queue 1006, receive queue 1008, memory 1010, and bus interface 1012, and DMA engine 1052. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include PHY circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to perform MAC address filtering on received packets, process MAC headers of received packets by verifying data integrity, remove preambles and padding, and provide packet content for processing by higher layers. MAC circuitry 1016 can be configured to assemble data to be transmitted into packets, which include destination and source addresses along with network control information and error detection hash values.

Processors 1004 can be a combination of a: processor, core, graphics processing unit (GPU), field programmable gate array (FPGA), application specific integrated circuit (ASIC), or other programmable hardware device that allow programming of network interface 1000. For example, a "smart network interface" or SmartNIC can provide packet processing capabilities in the network interface using processors 1004.

Processors 1004 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to perform one or more of: (a) as a target receiver, tracking one or more packet gaps in received packet sequence numbers and indicating to a sender of packets non-delivered packets to identify a range of delivered packets and/or (b) as an initiator transmitter, causing transmission of one or more packets to a receiver and causing re-transmission of one or more packets based on receipt of an indication of a range of non-delivered packets or timeout, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 1024 can provide distribution of received packets for processing by multiple CPUs or cores using receive side scaling (RSS). When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1052 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Bus interface 1012 can provide an interface with host device (not depicted). For example, bus interface 1012 can be compatible with or based at least in part on PCI, PCI Express, PCI-x, Serial ATA, and/or USB (although other interconnection standards may be used), or proprietary variations thereof.

Figure 11:
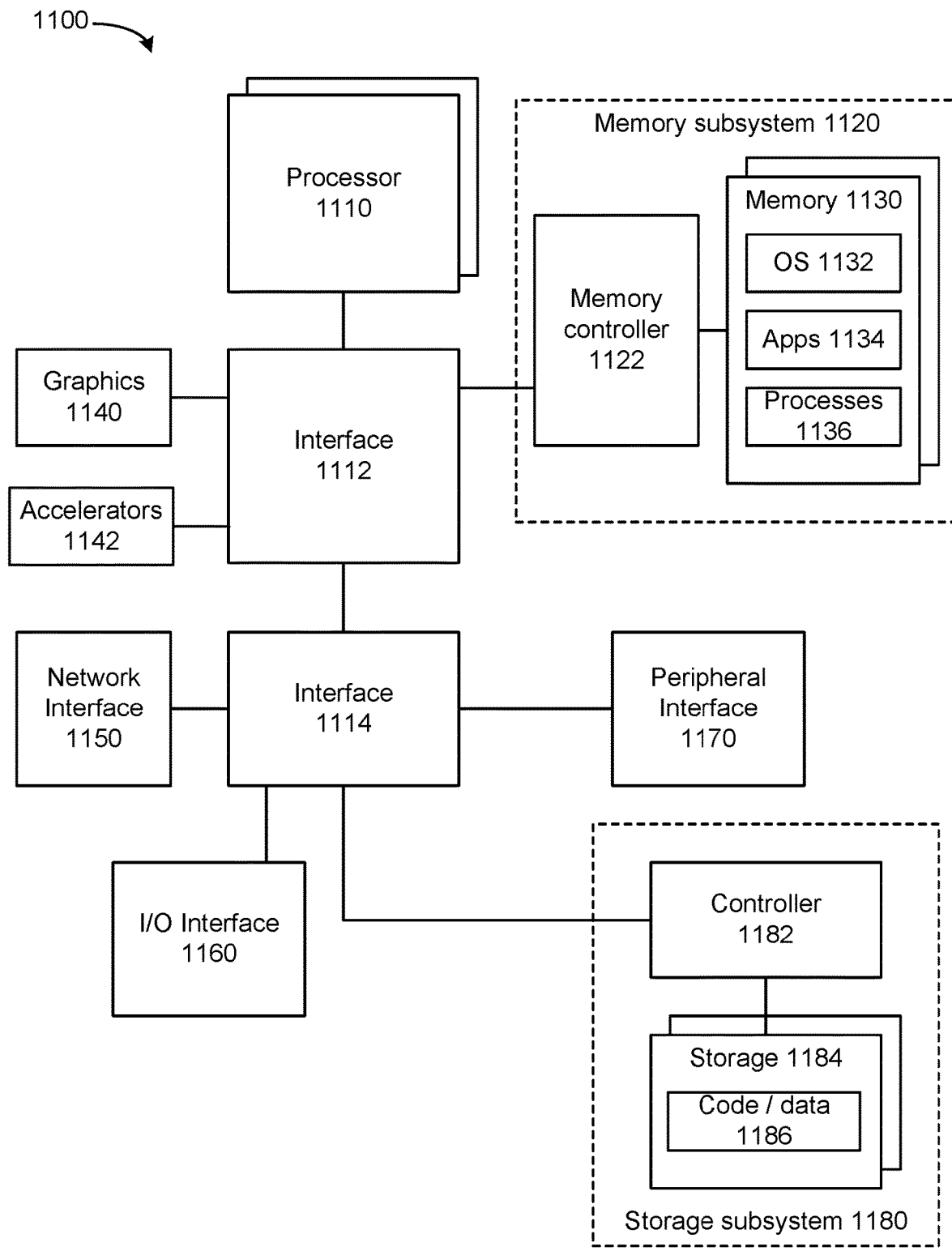
FIG. 11 depicts an example computing system.

FIG. 11 depicts an example computing system. Components of system 1100 (e.g., processor 1110, network interface 1150, and so forth) to perform tag matching operation to support both one or more eager transactions and one or more rendezvous transactions using a tag-matching protocol, as described herein. System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 1140 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a fixed function or programmable offload engine that can be accessed or used by a processor 1110. For example, an accelerator among accelerators 1142 can provide compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It can be understood that memory controller 1122 could be a physical part of processor 1110 or a physical part of interface 1112. For example, memory controller 1122 can be an integrated memory controller, integrated onto a circuit with processor 1110.

In some examples, OS 1132 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others. In some examples, a driver can configure network interface 1150 to perform tag matching operation to support both one or more eager transactions and one or more rendezvous transactions using a tag-matching protocol, as described herein. In some examples, a driver can enable or disable offload to network interface 1150 to perform tag matching operation to support both one or more eager transactions and one or more rendezvous transactions using a tag-matching protocol, as described herein. A driver can advertise capability of network interface 1150 to perform tag matching operation to support both one or more eager transactions and one or more rendezvous transactions using a tag-matching protocol, as described herein. OS 1132 can communicate with a driver of network interface 1150 to determine that network interface 1150 can perform a tag matching and OS 1132 can request the driver to turn on such tag matching capability.

Applications 1134 and/or processes 1136 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine.

Second, containers provide added security since the software will not affect the host operating system. While an installed application may alter system settings and modify resources, such as the Windows registry, a container can only modify settings within the container.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory.

Some examples of network interface 1150 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (e.g., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nano station (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising circuitry to perform offloaded tag matching operation to support both one or more eager transactions and one or more rendezvous transactions using a tag-matching protocol.

Example 2 includes one or more examples, wherein the tag matching operation is offloaded from a server to the network interface device.

Example 3 includes one or more examples, wherein the network interface device comprises circuitry to: receive messages from one or more senders, wherein the messages comprise tags and select one or more of the messages to write into a buffer based on matching on sender and/or tag.

Example 4 includes one or more examples, wherein the select one or more of the messages to write into a buffer based on matching on sender and/or tag comprises: receive a posted-to list and determine if a sent message matches an entry in the received posted-to list.

Example 5 includes one or more examples, wherein the network interface device comprises circuitry to: store at least one received eager message into a buffer prior to clear to send for the at least one received eager message and write the at least one received eager message to an application buffer after matching a tag for the clear to send with the at least one received eager message.

Example 6 includes one or more examples, wherein the network interface device comprises circuitry to: selectively discard the at least one received eager message from the buffer, indicate, in a clear to send message, to a sender that at least one received eager message was discarded from the buffer, and receive at least one resent discarded eager message.

Example 7 includes one or more examples, wherein the network interface device comprises circuitry to: support a packet reliability protocol independent from the tag matching operation.

Example 8 includes one or more examples, wherein the tag-matching protocol identifies packets as delivered or results in an error indication where delivery is not made.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 10 includes one or more examples, and includes a server coupled to the network interface device, wherein the server is to offload the tag matching operation to the network interface device.

Example 11 includes one or more examples, and includes a datacenter, wherein a data sender comprises the server, the network interface device, and a receiver and wherein packets are transmitted using the protocol.

Example 12 includes one or more examples, and includes a computer-readable medium comprising instructions stored thereon, that if executed, cause at least one processor to: configure a network interface device performance of a tag matching operation to support both one or more eager transactions and one or more rendezvous transactions using a tag-matching protocol.

Example 13 includes one or more examples, and includes instructions stored thereon, that if executed, cause at least one processor to: configure the network interface device to: receive messages from different senders, wherein the messages comprise tags and select one or more of the messages to write into a buffer based on matching on sender and/or tag.

Example 14 includes one or more examples, wherein at least one eager transaction comprises a message sent without prior acknowledgement that the message can be received by a receiver by a clear to send and at least one rendezvous transaction comprises a message sent after acknowledgement that the message can be received by a receiver by a clear to send.

Example 15 includes one or more examples, and includes instructions stored thereon, that if executed, cause at least one processor to: configure the network interface device to: store at least one received eager message into a buffer prior to clear to send for the at least one received eager message and write the at least one received eager message to an application buffer after matching a tag for the clear to send with the at least one received eager message.

Example 16 includes one or more examples, and includes instructions stored thereon, that if executed, cause at least one processor to: execute an operating system (OS) to detect availability of the network interface device to perform tag matching operation and based on detecting availability of the network interface device to perform tag matching operation, the OS is to configure the network interface device to perform the tag matching operation.

Example 17 includes one or more examples, and includes a method comprising: a network interface device performing tag matching operations to support both one or more eager transactions and one or more rendezvous transactions.

Example 18 includes one or more examples, and includes the network interface device receiving messages from different senders, wherein the messages comprise tags and the network interface device selecting one or more of the messages to write into a buffer based on matching on sender and/or tag.

Example 19 includes one or more examples, wherein at least one eager transaction comprises a message sent without prior acknowledgement that the message can be received by a receiver by a clear to send and at least one rendezvous transaction comprises a message sent after acknowledgement that the message can be received by a receiver by a clear to send.

Example 20 includes one or more examples, and includes utilizing a packet reliability protocol to transport one or more eager transactions and one or more rendezvous transactions, wherein the packet reliability protocol is independent from the tag matching operations.

What is claimed is:

1. An apparatus comprising:
    a network interface device comprising circuitry to perform offloaded tag matching operation to support both one or more eager transactions and one or more rendezvous transactions using a tag-matching protocol, wherein to perform the offloaded tag matching operation, the circuitry is to:
        store at least one received eager message into a buffer prior to sending a clear to send for the at least one received eager message and
        write the at least one received eager message to a second buffer after matching a tag for the at least one received eager message with the clear to send.

2. The apparatus of claim 1, wherein the tag matching operation is offloaded from a server to the network interface device.

3. The apparatus of claim 1, wherein the network interface device comprises circuitry to:
    receive messages from one or more senders, wherein the messages comprise tags and
    select one or more of the messages to write into a buffer based on matching on sender and/or tag.

4. The apparatus of claim 3, wherein the select one or more of the messages to write into a buffer based on matching on sender and/or tag comprises:
    receive a posted-to list and
    determine that a sent message matches an entry in the received posted-to list.

5. The apparatus of claim 1, wherein the network interface device comprises circuitry to:
    selectively discard the at least one received eager message from the buffer,
    indicate, in a clear to send message, to a sender that at least one received eager message was discarded from the buffer, and
    receive at least one resent discarded eager message.

6. The apparatus of claim 1, wherein the network interface device comprises circuitry to:
    perform a packet reliability protocol independent from the tag matching operation.

7. The apparatus of claim 1, wherein the tag-matching protocol identifies packets as delivered or results in an error indication where delivery is not made.

8. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

9. The apparatus of claim 1, comprising a server coupled to the network interface device, wherein the server is to offload the tag matching operation to the network interface device.

10. The apparatus of claim 9, comprising a datacenter, wherein a data sender comprises the server, the network interface device, and a receiver and wherein packets are transmitted using the tag matching protocol.

11. The apparatus of claim 1, wherein the network interface device is to write the at least one received eager message to an application buffer after matching a tag for the clear to send with the at least one received eager message.

12. At least one non-transitory computer-readable medium comprising instructions stored thereon, that when executed, cause at least one processor to:
    configure a network interface device performance of a tag matching operation to support both one or more eager transactions and one or more rendezvous transactions using a tag-matching protocol, wherein the tag matching operation comprises:
        store at least one received eager message into a buffer prior to sending a clear to send for the at least one received eager message and
        write the at least one received eager message to a second buffer after matching a tag for the at least one received eager message with the clear to send.

13. The computer-readable medium of claim 12, comprising instructions stored thereon, that when executed, cause at least one processor to:
    configure the network interface device to:
    receive messages from different senders, wherein the messages comprise tags and
    select one or more of the messages to write into a buffer based on matching on sender and/or tag.

14. The computer-readable medium of claim 12, wherein
    at least one eager transaction comprises a message sent without prior acknowledgement that the message can be received by a receiver by a clear to send and
    at least one rendezvous transaction comprises a message sent after acknowledgement that the message can be received by a receiver by a clear to send.

15. The computer-readable medium of claim 12, comprising instructions stored thereon, that when executed, cause at least one processor to:
    execute an operating system (OS) to detect availability of the network interface device to perform tag matching operation and based on detecting availability of the network interface device to perform tag matching operation, the OS is to configure the network interface device to perform the tag matching operation.

16. The computer-readable medium of claim 12, comprising instructions stored thereon, that when executed, cause at least one processor to:
    configure the network interface device to:
    write the at least one received eager message to an application buffer after matching a tag for the clear to send with the at least one received eager message.

17. A method comprising:
    a network interface device performing tag matching operations to support both of one or more eager transactions and one or more rendezvous transactions, the tag matching operations comprise:
        storing at least one received eager message into a buffer prior to sending a clear to send for the at least one received eager message and writing the at least one received eager message to a second buffer after matching a tag for the at least one received eager message with the clear to send.

18. The method of claim 17, comprising:

the network interface device receiving messages from different senders, wherein the messages comprise tags and the network interface device selecting one or more of the messages to write into a buffer based on matching on sender and/or tag.

19. The method of claim 17, wherein at least one eager transaction of the one or more eager transactions comprises a message sent without prior acknowledgement that the message can be received by a receiver by a clear to send and at least one rendezvous transaction of the one or more rendezvous transactions comprises a message sent after acknowledgement that the message can be received by a receiver by a clear to send.

20. The method of claim 17, comprising:

utilizing a packet reliability protocol to transport one or more eager transactions and one or more rendezvous transactions, wherein the packet reliability protocol is independent from the tag matching operations.

* * * * *